(12) United States Patent
Bolliger

(10) Patent No.: US 11,342,701 B2
(45) Date of Patent: May 24, 2022

(54) SOCKET BODY

(71) Applicant: Stäubli Electrical Connectors AG, Allschwil (CH)

(72) Inventor: Lars Bolliger, Allschwil (CH)

(73) Assignee: Stäubli Electrical Connectors AG, Allschwil (CH)

( * ) Notice: Subject to any disclaimer, the term of this patent is extended or adjusted under 35 U.S.C. 154(b) by 0 days.

(21) Appl. No.: 17/045,296

(22) PCT Filed: Apr. 17, 2019

(86) PCT No.: PCT/EP2019/060024
§ 371 (c)(1),
(2) Date: Oct. 5, 2020

(87) PCT Pub. No.: WO2019/206784
PCT Pub. Date: Oct. 31, 2019

(65) Prior Publication Data
US 2021/0151922 A1 May 20, 2021

(30) Foreign Application Priority Data
Apr. 24, 2018 (EP) .................................. 18169104

(51) Int. Cl.
*H01R 13/11* (2006.01)
*B23C 5/08* (2006.01)
(Continued)

(52) U.S. Cl.
CPC .............. *H01R 13/111* (2013.01); *B23C 5/08* (2013.01); *H01R 13/14* (2013.01); *H01R 13/187* (2013.01)

(58) Field of Classification Search
CPC .............................. H01R 13/111; H01R 13/11
See application file for complete search history.

(56) References Cited

U.S. PATENT DOCUMENTS 2,280,027 A * 4/1942 Busse ................... H01R 13/111
403/182
3,129,050 A * 4/1964 Dupre ................... H01R 13/111
439/852

(Continued)

FOREIGN PATENT DOCUMENTS

| CN | 101821907 A | 9/2010 |
|---|---|---|
| CN | 107069287 A | 8/2017 |

(Continued)

OTHER PUBLICATIONS

International Search Report of PCT/EP2019/060024 dated Aug. 21, 2019 [PCT/ISA/210].

*Primary Examiner* — Ross N Gushi
(74) *Attorney, Agent, or Firm* — Sughrue Mion, PLLC

(57) ABSTRACT

A socket body (1) comprises a socket space (3) which is delimited by a socket wall (2), extends along a center axis (M), wherein the socket space (3) has a socket opening (22), which is surrounded by an end surface (6). A notch (4) extends through the socket wall (2) at an angle ($\alpha$) to the center axis (M) such that a spring lug (5) is formed, which spring lug (5) is bent into the socket opening (3). The notch (4) has a right-hand portion (7) and a left-hand portion (8), wherein a center plane (ME) extends through the center axis (M) centrally between the two portions (7, 8). As seen from the outer side of the socket body (1), an upper surface (16) of the notch (4) intersects exclusively the lateral surface (11) of the socket wall (2), but not the end surface (6).

26 Claims, 7 Drawing Sheets

(51) Int. Cl.
*H01R 13/14* (2006.01)
*H01R 13/187* (2006.01)

(56) References Cited

U.S. PATENT DOCUMENTS

| | | | | |
|---|---|---|---|---|
| 4,666,227 | A | * | 5/1987 | Galizia ................. H01R 13/111 439/252 |
| 9,362,645 | B2 | * | 6/2016 | Meunier ................. H01R 43/16 |
| 2006/0264124 | A1 | | 11/2006 | Meyer et al. |
| 2011/0028039 | A1 | | 2/2011 | Hängärtner et al. |

FOREIGN PATENT DOCUMENTS

| | | |
|---|---|---|
| DE | 20008846 U1 | 9/2000 |
| EP | 0 259 546 A2 | 3/1988 |
| EP | 0 856 913 A1 | 8/1998 |
| GB | 437546 A | 10/1935 |

\* cited by examiner

SOCKET BODY

CROSS REFERENCE TO RELATED APPLICATIONS

This application is a National Stage of International Application No. PCT/EP2019/060024, filed Apr. 17, 2019, claiming priority to European Patent Application No. 18169104.9, filed Apr. 24, 2018.

TECHNICAL FIELD

The present invention relates to a socket body according to the preamble of claim 1 and a method for producing a corresponding socket body as claimed in claim 15.

PRIOR ART

Socket bodies for electric plug connections are known from the prior art. Such socket bodies have a socket opening into which a plug pin can be pushed. An electric contact is transmitted between the outside of the plug pin and the inside of the socket opening.

FR 2 596 588 shows an example of such a socket body. The socket body has a notch which extends from the front side into the socket body. As a result of this, a tab is generated which is bent toward the socket opening so that the cross-section of the socket opening is reduced in size. The tab is slightly resilient and comes into contact with the plug pin. One disadvantage of the formation of the notch is that the tab can push the plug pin away from the push-in axis when the plug pin is pushed in. As a result of this, increased plugging forces are required to produce the electric plug connection between socket body and plug pin.

SUMMARY OF THE INVENTION

Proceeding from this prior art, one object of the invention lies in the provision of a socket body which overcomes the disadvantages of the prior art. In particular, it is an object of the present invention to provide a socket body which has a tab which produces improved contact properties for a plug pin.

A socket body accordingly comprises a socket space delimited with a socket wall and extending along a center axis for receiving a plug pin. At least one notch extends as seen in cross-section transverse to the center axis inclined at an angle to the center axis through the socket wall in such a manner that at least one spring tab is formed, which spring tab is bent into the socket space. The at least one notch furthermore has as seen from the front surface of the socket body a right portion and a left portion, wherein a center plane extends centrally between these two portions through the center axis. An upper notch surface of the at least one notch exclusively intersects the shell surface of the socket body, but not the front surface of the socket body.

Due to the fact that the upper notch surface exclusively intersects the shell surface, but not the front surface, a notch can be provided which improves the spring characteristics of the spring tab. In particular, the spring characteristics can be improved such that a greater force is required to bend the spring tab into the socket opening and that a greater contact force on the plug in the socket opening can be provided.

Moreover, the rigidity of the spring tab can be increased because this can be formed to be comparatively shorter. As a result of this, a higher number of plug cycles is enabled alongside the same spring characteristics and the same contact characteristics.

The notch is preferably provided by machining, in particular by milling by means of a milling tool.

The angle is defined as a general angle of inclination of the notch. In particular in the undeformed state of the spring tab. If the spring tab is accordingly in the undeformed state, the upper notch surface and the lower notch surface run at the said angle. In the deformed state, the angle can be determined at the lower notch surface and the upper notch surface runs slightly more flat to the center axis than the lower notch surface.

Depending on the formation and number of spring tabs, the electric contact is provided either between the plug pin pushed into the socket space and between the surface of the socket space and the spring tab; or between the plug pin pushed into the socket space and between the spring tab.

The spring tab is oriented with its free end toward the socket opening. This means that the socket body already comes into contact with the spring tab in the case of a relatively small push-in depth during pushing into the socket space. As a result of this, the required plugging force increases sharply, as a result of which a defined push-in procedure is enabled.

The number of notches can be variable depending on the embodiment, which varies the number of spring tabs. A spring tab is created for each notch. It is possible that precisely one single notch is arranged. In other variants, two or three or four or even more notches and the corresponding number of spring tabs are conceivable. The notches are preferably arranged distributed around the circumference of the socket body, wherein the distances between the notches are formed to be the same in each case. It is also possible that several notches are arranged spaced apart from one another in the direction of the center axis.

The notch is preferably arranged such that a cylindrical guide section which extends from the front surface of the socket body into the socket space for receiving the plug pin is formed, which cylindrical guide section has an inner wall which runs fully around the center axis. As seen in the push-in direction, the cylindrical guide section firstly adjoins the socket opening, wherein the spring tab subsequently projects into the socket space with further increasing depth into the socket space. In other words, this means that a cylindrical guide section adjoins the socket opening, which cylindrical guide section correspondingly guides the plug pin during pushing into the socket opening with its inner wall. This has the advantage that the center axis of the plug pin is aligned collinearly to the center axis of the socket space before the plug pin hits the spring tab.

The guide section preferably has, as seen from the front surface of the socket body, a guide length which is between 5% and 100% or between 20% and 50% of the diameter of the socket space. Good results in terms of guidance were achieved in this length range.

The socket body preferably has in the region of the spring tab an outer recess which extends from the shell surface into the socket body, wherein the recess is formed in such a manner that the flexibility of the spring tab is increased. The recess is particularly preferably arranged on the outside on the shell surface opposite a region which is the lowest point of the notch. The outer recess is preferably provided by machining, in particular by milling by means of a milling tool.

The recess weakens the spring tab overall, but has the advantage that the spring characteristics of the spring tab can be varied depending on the field of application with the size and/or shape of the recess. One change can in particular be a reduction in the rigidity of the spring tab.

The outer recess preferably has a flat recess surface which is oriented, as seen in cross-section, inclined at an angle to the center axis. The flat recess surface correspondingly runs in a flat surface and forms a cylinder section.

The recess surface preferably extends partially into the socket space. The recess surface particularly preferably extends into the socket space in such a manner that a functional opening is created. The functional opening can serve, for example, as an inspection opening. The complete and/or the correct pushing in of the plug pin can be checked via this inspection opening. Alternatively, the function opening can serve to conduct dust generated during the plugging process away via the inspection opening.

The recess surface preferably extends, as seen from the front surface, to the same notch depth as the at least one notch. Alternatively, the recess surface extends, as seen from the front surface, to a shorter or larger depth than the notch depth of the at least one notch. The spring characteristics and/or the flexibility can be changed by the variation of the depth of the notch surface.

The term "depth of the recess surface" refers to the maximum expansion of the recess surface in the direction of the center axis from the front side.

The end region of the recess surface is preferably formed to be rounded with a rounding at the lowest point of the recess. A transition surface then adjoins the rounding, which transition surface forms a transition into the shell surface. The notch effect in the end region can be minimized by the rounding, as a result of which the spring tab is less susceptible to fracture.

The outer recess preferably has an end-side surface, wherein the end-side surface is preferably at an angle of substantially 90° to the recess surface. The end-side surface can directly adjoin the recess surface or is indirectly adjoined via the rounding of the recess surface.

The notch is preferably delimited at the upper side by the upper notch surface and at the bottom side by a lower notch surface, which notch surfaces extend preferably parallel to one another in the case of an unbent spring tab. The spring tab preferably lies in the deformed state in such a manner that the upper notch surface comes into contact with its free end with the lower notch surface. As a result of this contact, a simple and nevertheless specific deformation of the spring tab is enabled during production of the socket body. Alternatively, the spring tab lies in the deformed state preferably such that the upper notch surface does not come into contact with its free end with the lower notch surface.

The notch is therefore delimited substantially by the upper and the lower notch surface. The terms upper and lower are to be understood in the context of the notch surfaces such that the lower notch surface, as seen in cross-section, lies closer to the socket space than the upper notch surface.

The recess surface preferably runs parallel to the notch surfaces of the notch so that the spring tab has a constant thickness as seen in the region of the recess surface at a right angle to the recess surface. Alternatively, the recess surface runs inclined at an angle to the notch surfaces, in particular to the upper notch surface, of the notch so that the spring tab has a variable thickness as seen in the region of the recess surface at a right angle to the recess surface.

The lower notch surface preferably extends from the front surface of the socket body into the socket body. This means that the notch extends from the shell surface and the front surface into the socket body. Alternatively, the lower notch surface can also extend from the shell surface of the socket body into the socket body.

The notch preferably intersects the center axis as seen in cross-section and thus extends up to below the center axis. This has the advantage that the thickness of the spring tab can be increased. Alternatively, the notch can, however, also only extend above the center axis.

Further advantageous embodiments are characterized in that the notch extends transverse to the center axis and, as seen parallel to its notch surfaces, fully through the socket body;

and/or the notch has a notch width which is smaller than 10% of the maximum notch depth as seen in the direction of the center axis;

and/or the notch as seen in cross-section is at an angle of 2° to 45°, in particular at an angle of 10° to 30° to the center axis.

The notch width in the case of socket bodies with larger diameters is preferably larger than in the case of socket bodies with smaller diameters. This means that, in the case of a socket body with a large notch width, a notch with a larger notch width is provided, while in the case of a socket body with a small diameter a notch with a smaller notch width is provided.

These further advantageous embodiments have in particular the advantage that the spring characteristics of the spring tab can be further optimized and adapted to the application.

The notch preferably has a notch base which is configured to be rounded with a rounding which connects the two notch surfaces to one another. The center point of the rounding of the right portion and the center point of the rounding of the left portion preferably lie in a common plane which lies at a right angle to the center plane.

The notch preferably has side edges which have the shape of a part of an ellipse in a projection plane at a right angle to the said center plane and extending through the center axis.

The recess preferably has a side edge which has the shape of a part of an ellipse in a projection plane at a right angle to the said center plane and extending through the center axis.

The said notch surfaces are preferably part of a surface of a flat cylinder section, which cylinder section runs inclined at an angle to the center axis.

The stated recess surface is preferably part of a surface of a flat cylinder section, which cylinder section runs inclined at an angle to the center axis.

The recess surface and the said notch surfaces are preferably flat surfaces. The term flat surface refers to a surface which extends in a plane.

In the case of a method for producing a socket body according to the above description, in a first step, the socket body is produced and, in a subsequent second step, the notch is produced with a milling tool, in particular with a disc milling tool. As a result of this, it is very easy to produce the socket body. In particular, the production of a notch by a milling tool is advantageous.

The recess is also preferably produced with a milling tool, in particular with a disc milling tool.

Particularly preferably, the disc milling tool for production of the recess is preferably arranged on the same milling arbor as the disc milling tool for the production of the notch. As a result of this, the notch and also the recess can be produced with one milling process.

BRIEF DESCRIPTION OF THE DRAWINGS

Preferred embodiments of the invention are described below on the basis of the drawings which only serve the purpose of explanation and are not to be interpreted in a restrictive manner. In the drawings.

DESCRIPTION OF PREFERRED EMBODIMENTS

Figure 1:
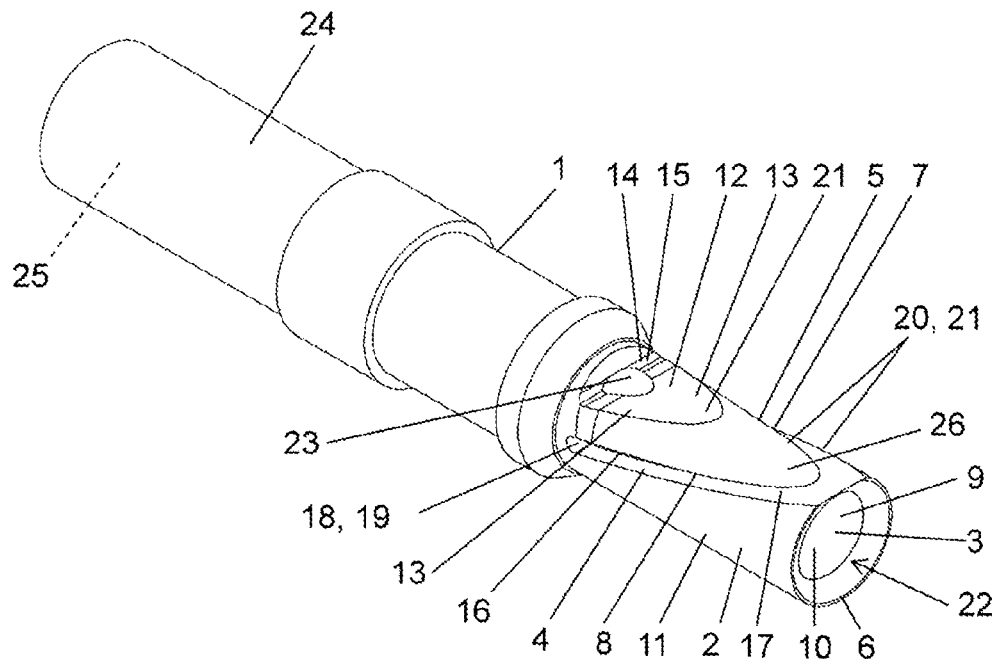
FIG. 1 shows a perspective view of a socket body according to one embodiment of the present invention.

An embodiment of a socket body 1 according to the invention is shown in the figures. Socket body 1 serves to receive a plug pin, not shown in the figures, wherein an electric contact can be produced between socket body 1 and plug pin. Socket body 1 is typically mounted in an electrically insulated housing which is not represented in the figures.

Socket body 1 comprises a socket space 3 which is delimited with a socket wall 2 and extends along a center axis M for receiving the plug pin. The plug pin is pushed into socket space 3 and an electric contact is produced between socket body 1 and the plug pin. Socket space 3 has a front surface 6 at the front side. Front surface 6 surrounds a socket opening 22 via which the socket pin can be pushed into socket space 3. Opposite front surface 6, the socket body comprises here a contact portion 24 which has an opening 25. Contact portion 24 with its opening 25 serves to connect to a further electric element, such as, for example, to a cable.

A notch 4 extends as seen in cross-section transverse to center axis M at an angle α inclined at an angle to center axis M through socket wall 2. Angle α is plotted in accordance with FIGS. 2, 4 and 5.

The notch extends through socket wall 2 such that a spring tab 5 is formed. After production of notch 4, spring tab 5 is bent into socket opening 3 or permanently deformed against socket opening 3.

Figure 4:
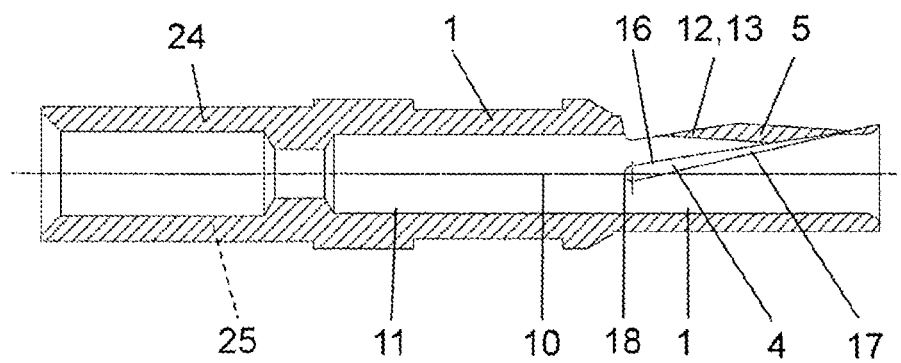
FIG. 4 shows a sectional representation along sectional line A-A according to FIG. 3.

Spring tab 5 serves substantially as a spring element which acts on the plug pin pushed into socket space 3 so that an electric contact can be produced between inner wall 10 of socket space 3 and the outside of the plug pin. It is shown in FIG. 4 and the figures of the other embodiments that spring tab 5 projects into the socket space.

Angle α is defined as a general angle of inclination of notch 4 in the undeformed state. If spring tab 5 is in the undeformed state, upper notch surface 16 and lower notch surface 17 run at said angle α. Angle α at lower notch surface 17 can be ascertained in the deformed state. As a result of the deformation of spring tab 5, upper notch surface 16 runs toward socket space 3 slightly more flatly than angle α. Lower notch surface runs with angle α. Notch 4 is, as seen in cross-section, at an angle α of 2° to 45°, in particular of 10° to 30° to center axis M. This means that under notch surface 17 is at an angle of 2° to 45°, in particular of 10° to 30° to center axis M.

Notch 4 extends, as seen from front surface 6 of socket body 1, with a right portion 7 and a left portion 8. Both portions 7, 8 are correspondingly shown in the perspective view of FIG. 1 and the plan view of FIG. 3. A center plane ME extends centrally between the two portions 7, 8 through center axis M. Center plane ME forms a plane of symmetry for socket body 1.

An upper notch surface 16 of notch 4 intersects, as seen from the outside of socket body 1, exclusively shell surface 11 of socket wall 2, but not front surface 6. As a result of this, as explained above, an improved spring tab 5 can be produced.

Upper notch surface 16 has, in the embodiment shown, the configuration of a flat cylinder section. The term "flat cylinder section" refers to a section which intersects a cylinder, here socket body 1, on a sectional plane which lies inclined at an angle to the cylinder axis, here to the center axis M. This means that upper notch surface 16 extends as a flat surface partially through socket body 1.

Notch 4 is arranged such that a guide section 9 which extends from front surface 6 of socket body 1 into socket space 3 is formed. Guide section 9 is cylindrical here and serves to receive the plug pin during pushing thereof into socket space 3. As a result of this, the socket pin is correspondingly guided in the region of the inlet into socket space 3 through cylindrical guide section 9 which completely surrounds the plug pin. The cylindrical guide section has an inner wall 10 which fully extends around center axis M. Inner wall 10 is inner wall 10 of socket space 3. Guide section 9 has, as seen from front surface 6, a guide length L which is between 5% and 10% of diameter D of socket space 3. A larger guide length is typically preferred. This is, however, not always possible on the grounds of space.

The guide section can be formed to be conical or rounded in the region of the front surface for simpler pushing in of the plug pin.

Socket body 1 furthermore has in the region of spring tab 5 an outer recess 12 which extends from shell surface 11 into socket body 1. Outer recess 12 is formed in such a manner that the flexibility and/or the spring force of spring tab 5 is increased. The increase can be seen in the fact that the flexibility or the spring force is increased in comparison with socket bodies without recess 12. It is furthermore possible to perform variation by a variation in the formation of the recess, the degree of spring force and/or flexibility. Recess 12 has a flat recess surface 13 which is oriented in cross-section with an angle β inclined at an angle to center axis M. Angle β corresponds approximately to angle α of notch 4; angle β can, however, also be steeper or flatter than angle α.

Figure 3:
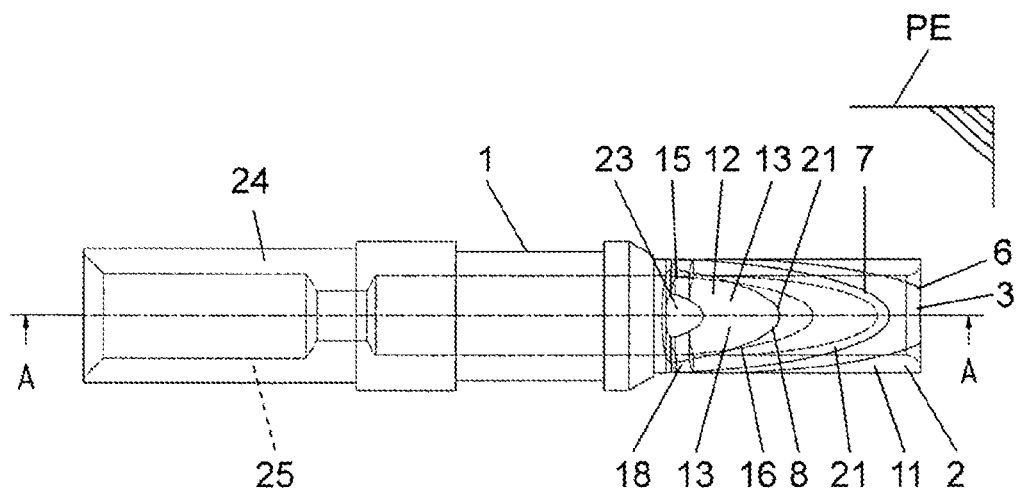
FIG. 3 shows a plan view of the socket body according to FIG. 1.

As can be identified from FIGS. 1 and 3, recess surface 13 extends partially into socket space 3. In particular, recess surface 13 extends into socket space in such a manner that a functional opening 23 into socket space 3 is created. The functional opening can be an inspection opening, wherein it can identified through inspection opening 23 whether the plug pin lies completely in socket space 3. The functional opening can, however, also serve to conduct possible dust which can be generated during production of the plug connection out of socket space 3.

End region 14 of recess surface 13 has at the lowest point of recess 12 a rounding 15. This means that end region 14 of recess surface 13 is formed to be rounded with a rounding 15. An end-side surface 27 which delimits recess 12 at the rear here adjoins rounding 15.

Notch 4 is delimited at the upper side by upper notch surface 16 and at the bottom side by a lower notch surface 17. In the unbent state of spring tab 5, the two notch surfaces 16, 17 run parallel to one another. In the deformed state, the two notch surfaces 16, 17 no longer lie parallel to one another, which is shown more precisely by FIGS. 2 and 4.

In the deformed state, spring tab 5 lies in such a manner that upper notch surface 16 with its free end preferably comes into contact with lower notch surface 17. This has the advantage that, in the case of deformation, spring tab 5 can be deformed to such an extent until it comes into contact with lower notch surface 17. This involves a determined deformation process. In the case of the other embodiments, it is, however, also conceivable that no contact arises between upper notch surface 16 and lower notch surface 17.

Recess surface 13 is, in the embodiments shown in the figures, parallel to upper notch surface 16. Spring tab therefore has, as seen in the region of recess surface 13 at a right angle to recess surface 13, a constant thickness T. Alternatively, recess surface 13 can also not run parallel to upper notch surface 16. If recess surface 13 does not run parallel to recess surface 13, recess surface 13 runs at a steeper or flatter angle to center axis M. In this case, spring tab 5 does not have a constant thickness T.

Lower notch surface 17 extends, as shown by FIGS. 1 to 4, partially from front surface 6 of socket body 1 into socket body 1. This means that front surface 6 is correspondingly intersected with notch surface 17. Lower notch surface 17 is, however, arranged in such a manner that it, in a region close to front surface 6, does not penetrate into socket space 3 so that cylindrical guide section 9 is not impaired by lower notch surface 17.

Figure 2:
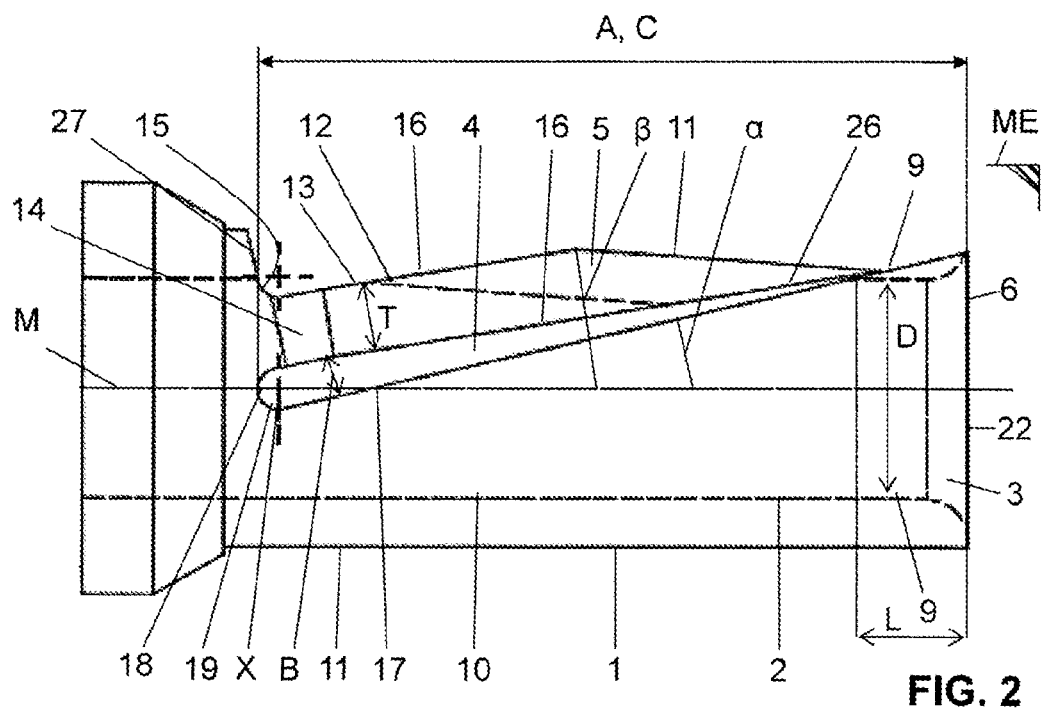
FIG. 2 shows a side view of the socket body according to FIG. 1.

Notch 4 is, as can be identified from FIGS. 2 and 4, arranged in such a manner that it intersects center axis M as seen in cross section. Notch 4 extends partially to below center axis M. In the undeformed state, notch 4 preferably has a constant clearance. In the deformed state, the clearance of notch 4 decreases, as seen transverse to center axis M, with increasing distance from front surface 6. Notch 4 can in other variants also end above center axis M.

Notch 4 extends transverse to center axis M, as represented in FIGS. 2 and 4, parallel to notch surfaces 16, 17 completely through socket body 1. Notch has a notch width B which is smaller than 20% of maximum notch depth C. The notch depth is the maximum depth of the notch as seen from front surface 6.

Recess surface 13 preferably extends as seen in the direction of center axis M to same depth A as notch depth C of the at least one notch 4. Depth A of recess surface 13 can alternatively as seen in the direction of center axis M, however, also be deeper or less deep than notch depth C.

Notch 4 has a notch base 18. Notch base 18 forms the end of portion 4 opposite the inlet of notch surface 16, 17 into the shell surface or into the front surface. Notch base 18 is formed to be rounded with a rounding 19 which connects the two notch surfaces 16, to one another. Center point X of rounding 19 of right portion 7 and center point X of rounding 19 of left portion 8 lie in a common plane E which lies at a right angle to said center plane ME.

Notch 4 has side edges 20 which have the form of a part of an ellipse in a projection plane PE at a right angle to stated center plane ME and extending through center axis M. Recess 12 equally has a side edge 21 which, in the stated projection plane, likewise has the configuration of an ellipse. The two side edges 20, 21 equally also form a corresponding ellipse on the surface.

Figure 5:
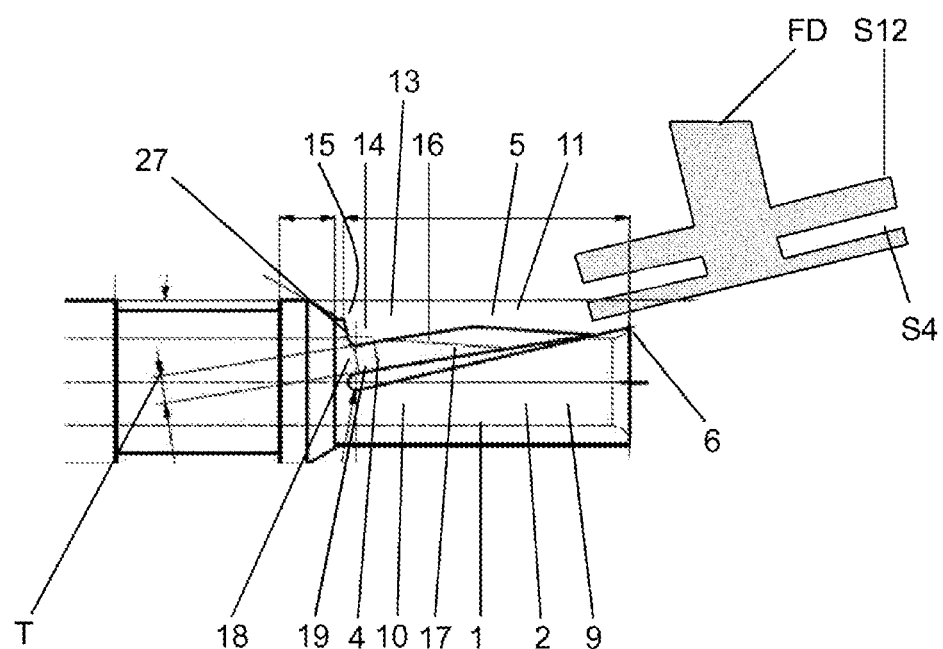
FIG. 5 shows a detailed view of the socket body according to the previous figures with a milling tool.

Socket body 1 with a corresponding tool is shown in FIG. 5. The tool has here the configuration of a disc miller. Notch 4 can be easily produced with a disc miller S4 and recess 12 can be easily produced with a disc miller S12. In particular, in this context, it is preferred if disc milling tool S4 for the production of the notch is arranged on the same milling arbor FD as disc milling tool S12 for the production of recess 12.

Figure 6A:
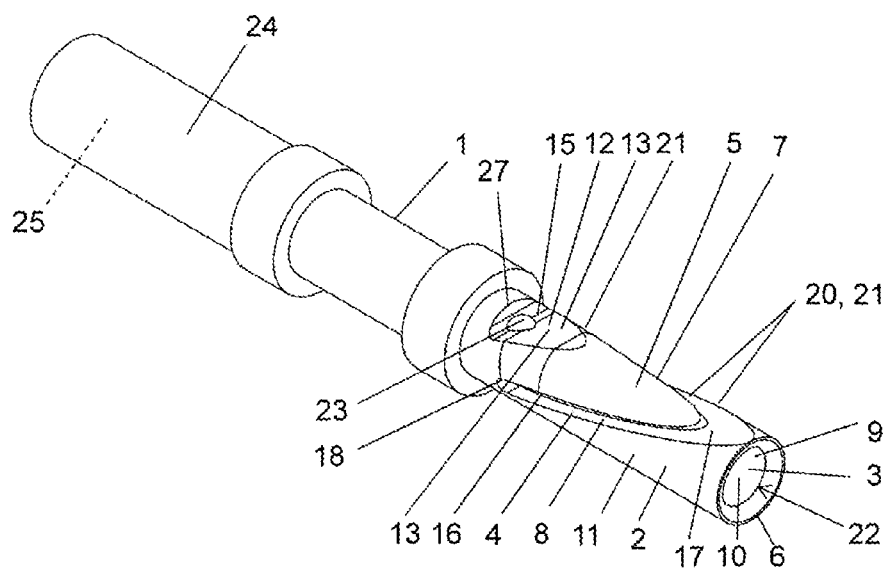
FIG. 6a/6b show views of a second embodiment of a socket body according to the present invention.
Figure 6B:
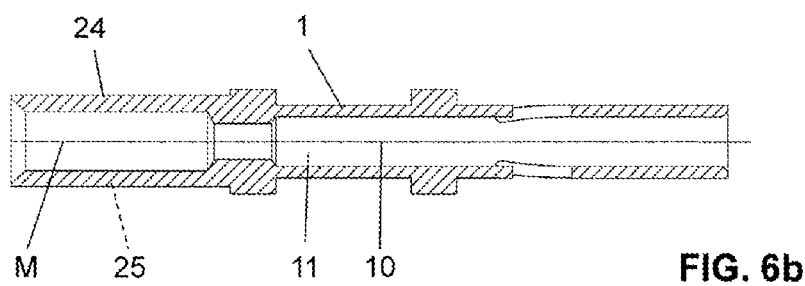

FIGS. 6a and 6b show a second embodiment of socket body 1. The same parts are provided with identical reference numbers and reference is made to the above description. In contrast to the first embodiment, the notch is formed here with a larger thickness and lower notch surface 17 does not intersect front surface 6, but rather extends from shell surface 11 into socket body 1. Upper notch surface 16 furthermore extends, as seen from the side, to below center axis M. Flat recess surface 13 is here not parallel to upper notch surface 16.

Figure 7A:
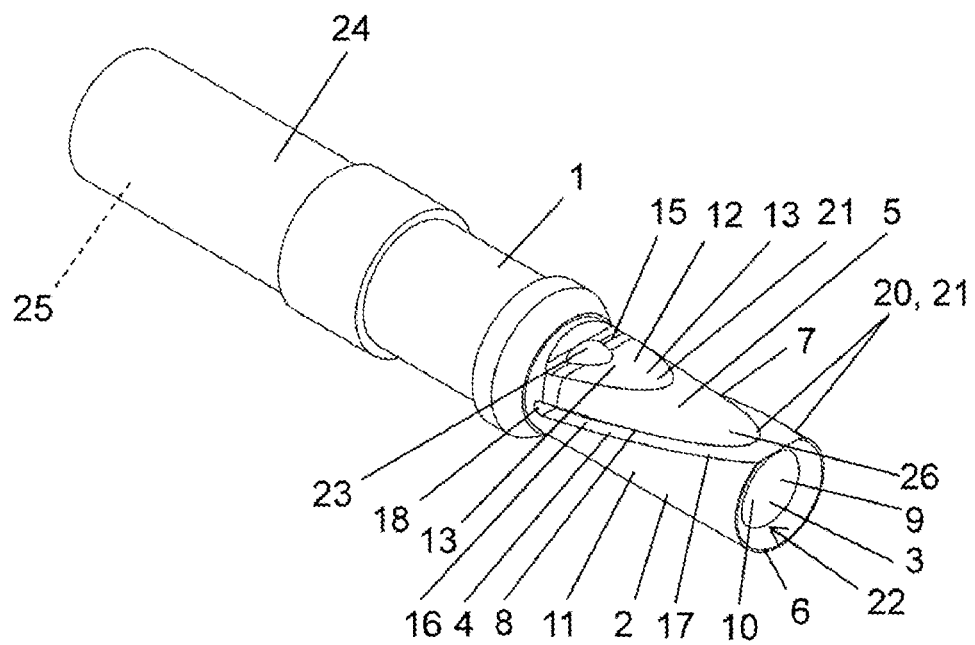
FIG. 7a/7b show views of a third embodiment of a socket body according to the present invention.
Figure 7B:
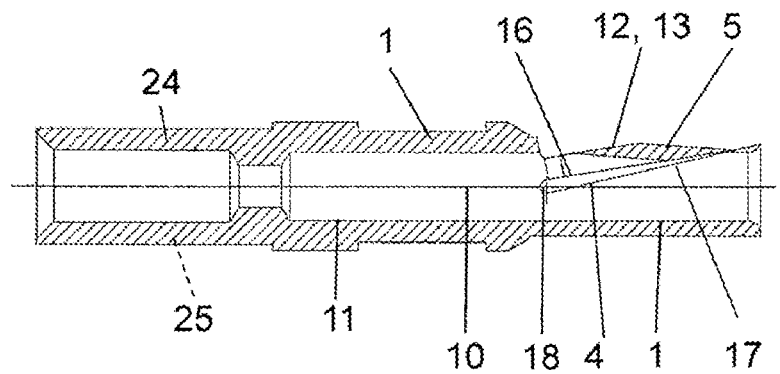

FIGS. 7a and 7b show a second embodiment of socket body 1. The same parts are provided with the same reference numbers and reference is made to the above description. In contrast to the previous embodiments, angle α is selected to be steeper.

Figure 8A:
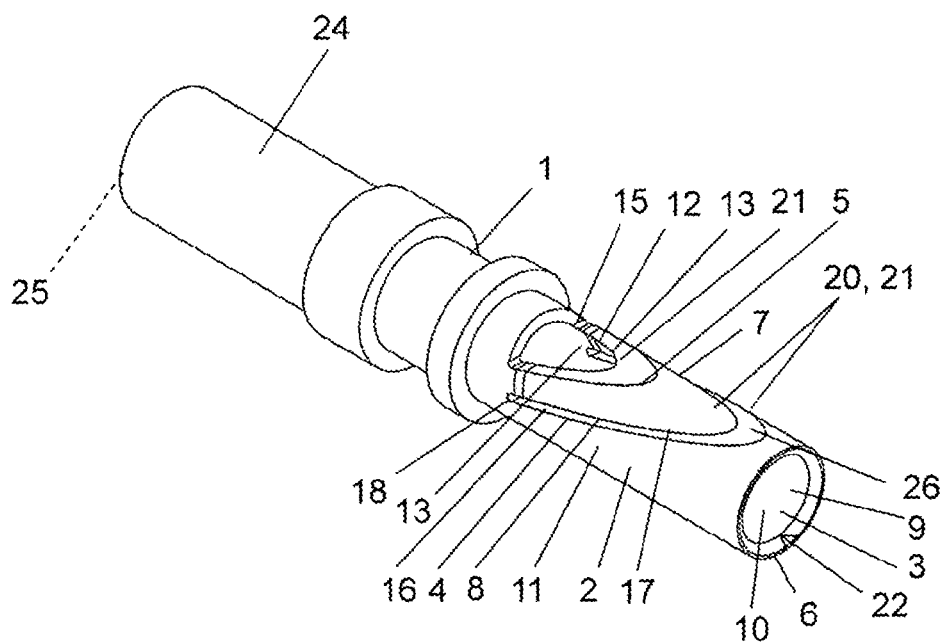
FIG. 8a/8b show views of a fourth embodiment of a socket body according to the present invention.
Figure 8B:
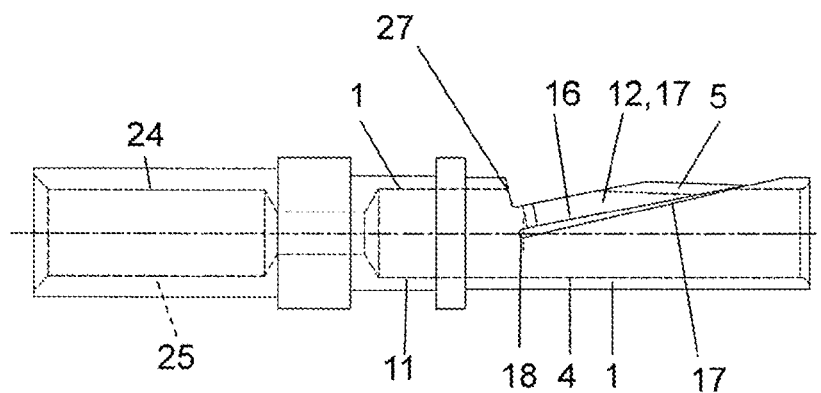

FIGS. 8a and 8b show a third embodiment of socket body 1. The same parts are provided with the same reference numbers and reference is made to the above description. In contrast to the previous embodiments, outer recess 12 is formed to be larger.

Figure 9A:
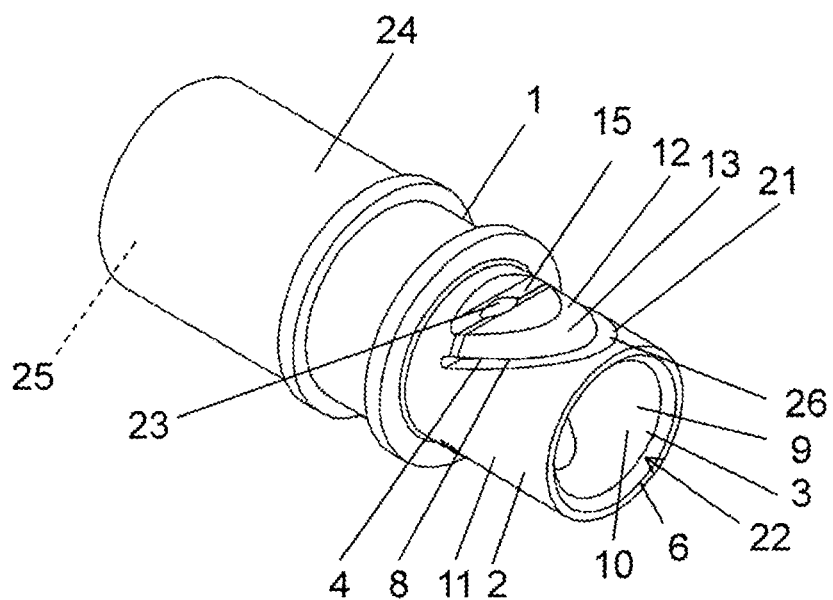
FIG. 9a/9b show views of a fifth embodiment of a socket body according to the present invention.
Figure 9B:
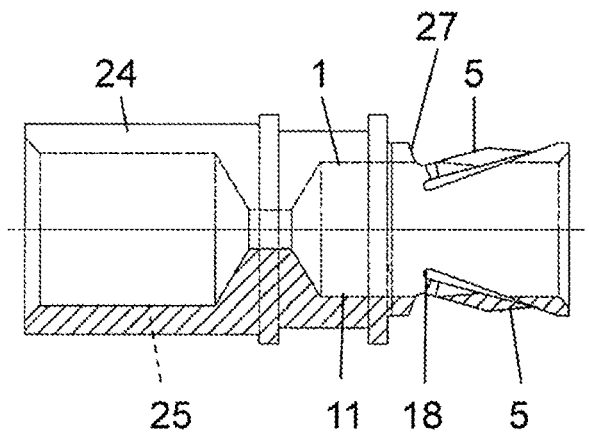

FIGS. 9a and 9b show a fourth embodiment of socket body 1. The same parts are provided with the same reference numbers and reference is made to the above description. In contrast to the previous embodiments, two notches 4 are arranged here, which two notches 4 then also form two spring tabs 5. In this embodiment, lower notch surface 17 does not intersect front surface 6.

Contacting between socket body and plug takes place in the embodiments according to FIGS. 1 to 8b by means of spring tab 5 and inner wall 10 of socket space 2. The contacting is performed by both spring tabs 5 in the embodiment of FIGS. 9a to 9c.

LIST OF REFERENCE NUMBERS

1 Socket body
2 Socket wall
3 Socket space
4 Notch
5 Spring tab
6 Front surface
7 Right portion
8 Left portion
9 Cylindrical guide section
10 Inner wall
11 Shell surface
12 Outer recess
13 Flat recess surface
14 End region
15 Rounding
16 Upper notch surface
17 Lower notch surface
18 Notch base
19 Rounding
20 Side edge
21 Side edge 22 Socket opening
23 Inspection opening
24 Contact portion
25 Opening
26 Free end
27 End-side surface
A Depth
B Notch width
C Notch depth
D Diameter
L Guide length
T Thickness
PE Projection plane
M Center axis
ME Center plane
X Center point
α Angle
β Angle
S4, S12 Milling tools
FD Milling arbor

The invention claimed is:

1. A socket body comprising a socket space delimited with a socket wall and extending along a center axis for receiving a plug pin,
wherein the socket space has a socket opening surrounded with a front surface, via which socket opening the plug pin can be pushed into the socket space,
wherein at least one notch extends inclined at an angle to the center axis through the socket wall in such a manner that at least one spring tab is formed, which spring tab is bent into the socket opening,
wherein an upper notch surface of the at least one notch from the outside of the socket body exclusively intersects the shell surface of the socket wall, but not the front surface, and
wherein the socket body has in the region of the at least one spring tab an outer recess which extends from the shell surface into the socket body, wherein the recess is formed in such a manner that the flexibility of the spring tab is increased.

2. The socket body as claimed in claim 1, wherein at least one of:
 i) precisely one single notch or two notches or three notches or four notches are arranged;
 ii) in the case of several notches, the notches are distributed at equal distances around the circumference of the socket body; or
 iii) several notches are arranged spaced apart from one another in the direction of the center axis.

3. The socket body as claimed in claim 1, wherein the at least one notch is arranged such that a cylindrical guide section which extends from the front surface of the socket body into the socket space for receiving the plug pin is formed, which cylindrical guide section has an inner wall which runs fully around the center axis.

4. The socket body as claimed in claim 3, wherein the guide section has, from the front surface of the socket body, a guide length which is between 5% and 100% of the diameter of the socket space or which is between 20% and 50% of the diameter of the socket space.

5. The socket body as claimed in claim 1, wherein the outer recess has a flat recess surface which is oriented, as seen in cross-section, inclined at an angle to the center axis.

6. The socket body as claimed in claim 5, wherein at least one of:
 i) the recess surface extends partially into the socket space;
 ii) the end region of the recess surface is formed to be rounded with a rounding at the lowest point of the recess;
 iii) the recess surface extends as seen from the front surface to the same depth as the notch depth of the at least one notch, or
 iv) the recess surface extends as seen from the front surface to a shorter or greater depth than the notch depth of the at least one notch.

7. The socket body as claimed in claim 6, wherein the recess surface extends partially into the socket space in such a manner that a functional opening into the socket space is created.

8. The socket body as claimed in claim 5, wherein the recess surface runs parallel to the notch surfaces of the notch so that the spring tab has a constant thickness as seen in the region of the recess surface at a right angle to the recess surface.

9. The socket body as claimed in claim 8, wherein the recess surface runs parallel to the upper notch surface.

10. The socket body as claimed in claim 5, wherein the recess surface runs inclined at an angle to the notch surfaces of the notch so that the spring tab has a variable thickness as seen in the region of the recess surface at a right angle to the recess surface.

11. The socket body as claimed in claim 10, wherein the recess surface runs inclined at an angle to the upper notch surface.

12. The socket body as claimed in claim 5, wherein the lower notch surface extends from the front surface of the socket body into the socket body; or wherein the lower notch surface extends from the shell surface of the socket body into the socket body.

13. The socket body as claimed in claim 1, wherein the outer recess has an end-side surface.

14. The socket body as claimed in claim 13, wherein the end-side surface is at an angle of substantially 90° to the recess surface.

15. The socket body as claimed in claim 1, wherein the at least one notch is delimited at the upper side by the upper notch surface and at the bottom side by a lower notch surface.

16. The socket body as claimed in claim 15, wherein the upper notch surface has a free end, and wherein the spring tab lies in the deformed state in such a manner that the upper notch surface comes into contact with its free end with the lower notch surface, or wherein the upper notch surface does not come into contact with its free end with the lower notch surface.

17. The socket body as claimed in claim 15, wherein the notch surfaces extend parallel to one another in case of unbent spring tab.

18. The socket body as claimed in claim 1, wherein at least one of:
 i) the notch intersects the center axis and extends to below the center axis;
 ii) in the undeformed state, the notch has a constant clearance;
 iii) the notch extends, as seen transverse to the center axis and parallel to its notch surfaces, completely through the socket body;
 iv) the notch has a notch width which is smaller than 10% of the maximum notch depth as seen in the direction of the center axis; or
 v) the notch, as seen in cross-section, is at an angle of 2° to 45° to the center axis (M).

19. The socket body as claimed in claim 1,
wherein the notch has a notch base which is formed to be rounded with a rounding which connects the two notch surfaces to one another, and
wherein the center point of the rounding of a right portion of said notch and a left portion of said notch lie in a common plane which lies at a right angle to the center plane which extends centrally between the two portions through the center axis.

20. The socket body as claimed in claim 1,
wherein at least one of:
i) the notch has, as seen from the front surface of the socket body, a right portion and a left portion,
wherein a center plane extends centrally between these two portions through the center axis,
wherein the notch has side edges which have the shape of a part of an ellipse in a projection plane at a right angle to the said center plane and extending through the center axis; or
ii) the recess has a side edge which has the shape of a part of an ellipse in a projection plane at a right angle to the said center plane and extending through the center axis.

21. The socket body as claimed in claim 1, wherein at least one of: i) surfaces of said notch are part of a surface of a flat cylinder section, which cylinder section runs inclined at an angle to the center axis or ii) a surface of said recess is part of a surface of a flat cylinder section, which cylinder section runs inclined at an angle to the center axis.

22. A method for producing a socket body as claimed in claim 1, wherein, in a first step, the socket body is produced and, in a subsequent second step, the notch is produced with a milling tool, in particular with a disc milling tool.

23. The method as claimed in claim 22, wherein the recess is produced with a milling tool.

24. The method as claimed in claim 23, wherein the recess is produced with a disc milling tool.

25. The method as claimed in claim 23, wherein the recess is produced with a disc milling tool, and wherein the disc milling tool for production of the recess is arranged on the same milling arbor as the disc milling tool for the production of the notch.

26. The socket body as claimed in claim 1, wherein the notch, as seen in cross-section, is at an angle of 10° to 30° to the center axis.

* * * * *